United States Patent
Frommann et al.

(10) Patent No.: US 11,885,301 B2
(45) Date of Patent: Jan. 30, 2024

(54) METHOD FOR IDENTIFYING A BLADE MALPOSITION OF A ROTOR BLADE OF A WIND POWER INSTALLATION

(71) Applicant: Wobben Properties GmbH, Aurich (DE)

(72) Inventors: Johannes Frommann, Hamburg (DE); Enno von Aswege, Großefehn (DE); Stephan Vollack, Aurich (DE)

(73) Assignee: Wobben Properties GmbH, Aurich (DE)

( * ) Notice: Subject to any disclaimer, the term of this patent is extended or adjusted under 35 U.S.C. 154(b) by 0 days.

(21) Appl. No.: 18/186,054

(22) Filed: Mar. 17, 2023

(65) Prior Publication Data
US 2023/0296084 A1     Sep. 21, 2023

(30) Foreign Application Priority Data
Mar. 17, 2022    (EP) ..................................... 22162806

(51) Int. Cl.
*F03D 17/00*     (2016.01)
*F03D 1/06*     (2006.01)

(52) U.S. Cl.
CPC .............. *F03D 17/00* (2016.05); *F03D 1/06* (2013.01); *F05B 2260/83* (2013.01); *F05B 2270/328* (2013.01)

(58) Field of Classification Search
CPC .......... F03D 17/029; F03D 17/00; F03D 7/00; F03D 7/024; F03D 7/0224; F05B 2270/328; F05B 2260/83
See application file for complete search history.

(56) References Cited

U.S. PATENT DOCUMENTS

| | | | |
|---|---|---|---|
| 2015/0337802 A1 | 11/2015 | Su et al. | |
| 2016/0003220 A1* | 1/2016 | Warfen | F03D 17/00 416/61 |
| 2021/0270235 A1* | 9/2021 | Jeppesen | F03D 7/0224 |

FOREIGN PATENT DOCUMENTS

CN            110925137 A     3/2020

* cited by examiner

*Primary Examiner* — David E Sosnowski
*Assistant Examiner* — Maxime M Adjagbe
(74) *Attorney, Agent, or Firm* — Seed IP Law Group LLP

(57) ABSTRACT

Provided is a method for identifying a blade malposition of a rotor blade of a wind power installation having one rotor and at least three rotor blades which in terms of the blade angles thereof are individually adjustable. For each rotor blade an actual angle is detected as the actual value of the blade angle; and the blade malposition is identified as a function of a blade angle deviation of the rotor blade and a rotational progress of the rotor. The blade angle deviation describes a deviation of the actual angle from a reference angle, and the rotational progress is representative of an angle about which the rotor has rotated onward after a start criterion. Blade malpositions in rotor blades which in terms of the blade angles thereof are individually adjustable are identified rapidly and reliably.

22 Claims, 4 Drawing Sheets

METHOD FOR IDENTIFYING A BLADE MALPOSITION OF A ROTOR BLADE OF A WIND POWER INSTALLATION

BACKGROUND

Technical Field

The invention relates to a method for identifying a blade malposition of a rotor blade of a wind power installation. The invention also relates to a wind power installation which carries out such a method.

Description of the Related Art

Wind power installations usually have a rotor with three rotor blades which are adjustable in terms of the blade angles thereof. Such wind power installations in most instances operate such that the rotor blades thereof in a partial-load operation, when the wind velocity is still below a nominal wind velocity, have an optimal blade angle. In the full-load operation, when the wind velocity is above the nominal wind velocity, the blade angles are adjusted such that the rotor blades are rotated out of the wind as the wind increases, so as to reduce the mechanical stress on said rotor blades. To this end, all three rotor blades have an identical predefined blade angle, the latter also being able to be referred to as a common or collective blade angle.

In order to take into account loads which are unevenly distributed across the rotor area and/or temporally variable loads on the rotor blades, it can be advantageous for the rotor blades to be individually adjusted in terms of the blade angles thereof, this also being known as individual pitch control (IPC) or individual blade adjustment. Such uneven loads may be caused in that the wind velocity and/or the wind direction varies along with the height. A tower shadow effect may also play a role.

In this way, the wind velocity is typically lower close to the ground and increases as the height increases. A rotor blade which in the course of the revolution thereof has just reached the lowest point is thus exposed to a different wind velocity than a rotor blade at the highest point. As a result of the individual blade angle adjustment, effects of this type can be taken into account and the loads can be reduced, or the output can be further maximized.

One problem that may arise in the blade adjustment is that a rotor blade is fixed in terms of the blade angle adjustment thereof. This may be for mechanical and/or electrical reasons.

In fixed rotor blades it is no longer guaranteed that the rotor blades are optimally aligned in relation to the wind. This can lead to potential extreme loads and in the worst case can damage or at least heavily stress components of the wind power installation.

It is problematic to reliably and rapidly identify such fixed rotor blades.

In wind power installations without individual blade adjustment, such a blade malposition can be readily identified by a deviation of an actual value from a predefined target value. In individually adjustable blade angles of the rotor blades, the predefined value of the blade angle continuously changes during a revolution of the rotor blade conjointly with the rotor. There is thus no fixed target value for comparison with the deviation. Moreover, it is a natural effect that the individual blade angles in the case of an individual blade adjustment deviate from a common blade angle. A malposition can thus not readily be derived from a deviation.

In particular in the case of an individual blade adjustment it is thus difficult to identify blade malpositions in an ideally rapid and reliable manner. Apart from a jammed or fixed rotor blade, the intention is to also identify malpositions in which the actual value of the blade angle no longer follows the target value in an optimal manner.

BRIEF SUMMARY

Provided herein is identifying in a rapid and reliable manner blade malpositions in rotor blades which in terms of the blade angles thereof are individually adjustable.

A method is provided. The method includes identifying a blade malposition, in particular an impermissible blade malposition, of a rotor blade of a wind power installation having one rotor and at least three rotor blades which in terms of the blade angles thereof are individually adjustable is proposed. For each rotor blade an actual angle is detected as the actual value of the blade angle, and the blade malposition is identified as a function of a blade angle deviation of the rotor blade and a rotational progress of the rotor. The blade angle deviation describes a deviation of the actual angle from a reference angle, and the rotational progress is representative of an angle about which the rotor has rotated onward after a start criterion.

In this way, the rotational progress of the rotor is the angle which the rotor blade has travelled after a start criterion as a result of the rotation of the rotor; the rotational progress is in particular representative of a rotor area swept by the rotor blade, said rotor area having been swept by the rotor blade after the start criterion. The focus is thus the rotation of the rotor, which however can be individually observed for each rotor blade. The position of the respective rotor blade can thus be observed, and how said position changes as a result of the rotation of the rotor. Conjointly with the rotation of the rotor, each rotor blade sweeps part of the rotor area, and the travelled angle of the rotor is thus representative of the swept rotor area, thus the swept part.

By taking into account the rotational progress in addition to the blade angle, the latter can be put in relation to the rotational progress and, as a result, a more targeted evaluation can be carried out. It has been recognized in particular here that a cyclical blade adjustment of the respective rotor blade is performed in an individual blade adjustment, this being coupled to the rotation of the rotor. Therefore, a permissible blade angle deviation can also depend on the rotor position. It has thus been recognized that a blade angle deviation in terms of malposition may be evaluated differently, depending on the position of the rotor.

The method is intended to be used for wind power installations, the rotor blades of the latter in terms of the blade angles thereof being individually adjustable. It is therefore possible to provide an individual blade angle for each rotor blade. It is likewise possible for the blade angle to be varied over time such that the temporal profile of the blade angle is individually predefined for each rotor blade. The blade angles of the three rotor blades, in particular the temporal profile of the blade angles of the three rotor blades, therefore differ from one another.

Since the blade angles can vary over time, the identification of a blade malposition is impeded. A blade malposition is in particular understood to be a fixed blade, thus a rotor blade of which the blade angle can no longer be adjusted. A blade malposition is likewise understood to mean that the blade angle of a rotor blade does not follow the predefined parameter. For example, when the actual blade angle follows the predefined blade angle with a temporal delay. It is likewise possible that the blade angle does indeed vary according to the predefined parameter, but does not reach the set value in terms of the amplitude thereof. A further example of a blade malposition can be the behavior of a rotor blade, the blade angle of the latter continuously increasing or decreasing. The amplitudes of potential deviations here may still be permissible but the entire behavior not, because there is an excessively long increase, for example, or the blade angle does not behave as anticipated during the rotational progress. The method is intended ideally to be able to identify all these blade malpositions in individually adjustable rotor blades of a wind power installation.

In particular, impermissible blade malpositions are to be identified. Not every blade angle deviation automatically leads to a safety risk. It is only when a critical value is exceeded, or a critical situation is reached, that a blade malposition is to be identified.

The method can be carried out such that for each individual rotor blade an actual angle is initially detected as the actual value of the blade angle. The actual angle here can be measured, for example by a suitable sensor (e.g., gauge, laser device), or determined in any other way. In this way, the actual angle corresponds to the actually occurring blade angle of a rotor blade.

The blade angle of a rotor blade here corresponds to the inclination angle, or pitch angle, of the rotor blade. The blade angle describes substantially the angle about which the rotor blade is inclined towards the rotor area. In order to rotate the rotor blade out of the wind, the blade angle is thus increased. Conversely, in order for the rotor blade to be rotated into the wind, the blade angle is decreased. The blade angles in the partial-load operation are typically in the range from 0 to 7°, but may also be higher, and also become negative.

Moreover, for each rotor blade the blade angle deviation, specifically the deviation of the actual angle from a reference angle, is determined. The reference angle can correspond to an identically predefined blade angle for all rotor blades, for example, which is also referred to as a collective blade angle. However, the reference angle can likewise be formed as the mean value of the actual angles of all rotor blades. Likewise, the reference angle can correspond to the actual angle of one of the other rotor blades. The reference angle here can be chosen such that the blade angle deviation is maximized.

Moreover, a rotational progress of the rotor is determined. A rotational progress is in particular determined individually for each rotor blade. The rotational progress is representative of an angle which the rotor blade has travelled after a start criterion. The rotational progress can in particular be a rotational progress angle, or be referred to as a rotational progress angle. It is thus determined how far the rotor with the respective rotor blade has rotated after a triggered start criterion. The rotational progress can in this way in particular also be representative of a rotor area swept by the rotor blade.

Of course, the rotor rotation is identical for all rotor blades. However, the rotational progress may differ between the rotor blades as a result of individual start criteria. Said rotational progress thus begins at different times.

The start criterion thus establishes the point in time from which it is determined what angle the rotor blade has swept, thus by which angle the rotor has rotated onward. For example, the start criterion can be determined by way of the temporal profile of the blade angles of the rotor blades. For example, the start criterion can be chosen based on when the actual angle of a rotor blade is maximized or minimized in relation to the actual angles of the other rotor blades. In other words, the start criterion is determined by the point in time at which the temporal profile of the blade angle of one rotor blade intersects the temporal profile of the blade angle of another rotor blade.

By virtue of conjointly rotating, wind-induced loads, full revolutions can in particular also be taken into account in the rotational progress, such that rotational progress angles of more than 360° are also possible. However, the rotational progress here is rarely substantially more than 360°. The rotational progress of the rotor blade is reset, thus set back to zero, as soon as a new start criterion establishes the beginning of a fresh determination of the rotational progress.

One criterion for the blade malposition of a rotor blade is identified as a function of the blade angle deviation of the rotor blade and the rotational progress of the rotor blade. A criterion for the blade angle deviation, as from which a blade malposition is identified, in particular varies as the rotational progress of the rotor blade increases. It has been recognized that an interaction between the blade angle deviation and the rotational progress can be taken into account in order to be able to positively identify a blade malposition, in particular in a rapid and reliable manner. For example, in the case of all three rotor blades being fixed and having a constant actual angle, the blade angle deviation is minor. However, the rotational progress incessantly increases further because no start criterion is triggered by the intersection of the profiles of the blade angles. Despite the minor blade angle deviation, a blade malposition can be identified in this instance by virtue of the ever increasing rotational progress.

It is likewise possible that the actual angle of a rotor blade continuously increases and the blade angle deviation heavily increases while the rotational progress increases only to a minimum extent. A blade malposition can also be identified in this case as a consequence of the severe blade angle deviation.

According to one aspect, for each of the rotor blades a target angle as a target value of the blade angle is predefined as a temporal, cyclical, in particular oscillating, profile. It is provided in particular here that the predefined parameter is established as a function of the arising wind conditions, in particular of the wind direction, the wind velocity and/or a wind gradient which describes a variation of the wind velocity and/or of the wind direction along with the location, in particular the height. Cyclical load variations which can be caused by variations of the wind direction and the wind velocity across the rotor area are addressed by this cyclical variation.

The predefined temporal profiles of the target angles here are phase-shifted in relation to one another. It is thus possible in particular to predefine the same target angle profile for each of the rotor blades, and to achieve a temporal offset of the target angles of the rotor blades by the phase shift. This takes into account that the rotor blades, depending on the location in the rotor area, are in each case exposed to approximately the same load but at different times in the rotation of the rotor. A sinusoidal profile can often readily replicate this and represents a continuous movement of the blade adjustment that forms a minor load for the adjustment procedure of the blades.

It has been recognized in particular here that an impermissible malposition is difficult to identify in the context of cyclical variation of the blade angles, regardless of whether the latter is sinusoidal or otherwise, and a solution is offered to this end.

According to one aspect, for each rotor blade it is continually determined, in particular in successive discrete temporal steps, whether the actual angle thereof is an extreme angle. The respective rotor blade here has an extreme angle when the actual angle thereof is larger than the actual angles of all other rotor blades, or when the actual angle thereof is smaller than the actual angles of all other rotor blades.

Additionally or alternatively, for each rotor blade it is continually determined, in particular in successive discrete temporal steps, whether the actual angle thereof is a non-extreme angle. The respective rotor blade here has a non-extreme angle when the actual angle thereof is smaller than an actual angle of at least one of the other rotor blades, and when the actual angle thereof is larger than an actual angle of at least one of the other rotor blades.

By predefining an oscillating profile of the target angles, the actual angles of the rotor blades, in the absence of any arising blade malposition, thus when everything runs without a malfunction, also vary continuously and are approximately known. The profiles of the target angles of the rotor blades and, in the absence of a blade malposition, thus also the profiles of the actual angles of the rotor blades repeatedly intersect in the process up to a determinable point in time. In this way, one rotor blade always has an actual angle which is larger than the actual angles of the two other rotor blades, and one rotor blade has an actual angle which is smaller than the actual angles of the two other rotor blades. Angles of this type, which are either larger or smaller than the actual angles of all of the other rotor blades, are referred to as extreme angles. Extreme angles, thus a maximum and a minimum angle, may also be referred to as enveloping angles because the profile of the extreme angles envelops the profiles of the other blade angles, in the case of three rotor blades the profile of the remaining angle.

By virtue of a predefined oscillating profile, the actual angle, in the absence of a blade malposition, changes continually from an extreme angle to a non-extreme angle in which the actual angle is neither smaller nor larger than the actual angles of all other rotor blades.

It has been recognized that this behavior can be utilized when identifying a blade malposition. To this end, a blade malposition is identified as a function of whether the actual angle is an extreme angle or a non-extreme angle.

Since the target angles are known, the anticipated profile of the actual angles in the absence of any blade malposition is also known. However, should a blade malposition arise, the profiles of the actual angles deviate from the profiles of the target angles. Consequently, in this instance one rotor blade also has an extreme angle, or a non-extreme angle, for a longer or shorter time than anticipated. The start criterion for a rotor blade can in particular be triggered as a function of whether the associated actual angle is an extreme or a non-extreme angle. The transition from the extreme angle to the non-extreme angle, or vice versa, can in particular be a start criterion. In this instance, the evaluation can specifically include the length of time during which an extreme angle or a non-extreme angle are in each case present.

This property of determining continually, in particular in successive discrete temporal steps, thus provides the precondition for the evaluation. This is to be understood to mean that these properties are recorded not sporadically but in an ongoing manner. This can take place in particular in the same way, in particular by way of the same sensor mechanism, as is otherwise used by the installation control system (e.g., controller), for example for the blade angle adjustment and actuation.

According to one aspect, the start criterion for a rotor blade is formed or triggered by a transition of the actual angle thereof from a non-extreme angle to an extreme angle.

The start criterion thus characterizes the point in time at which the profile of the actual angle of a rotor blade intersects the profile of the actual angle of one of the other rotor blades. The verification of extreme and/or non-extreme angles here is advantageous, because the exact profile does not have to be recorded, and the intersection point does not have to be exactly determined, but only the point in time has to be determined. It is thus sufficient to establish when a change from a non-extreme to an extreme angle has taken place.

It has furthermore been recognized that it is possible in the case of extreme angles to differentiate between a minimum angle, or between a lower enveloping angle, and a maximum angle, or an upper enveloping angle. In this instance, a start criterion for a rotor blade is in particular triggered by a transition of the actual angle thereof from a non-extreme angle to a maximum angle. It has been recognized that blade malpositions become problematic above all in the case of large actual angles, thus such angles at which the blade is rotated out of the wind. Therefore, it is sufficient for maximum angles for triggering the start criterion to be taken into account.

It has also been recognized that a blade malposition is more probable in the case of an extreme angle. The extreme angles form an enveloped range, thus an envelope, and the latter simultaneously also predefines an approximate range in which the angles move. An extreme angle thus already lies on the periphery of this enveloped range. To this end, it has been recognized that, apart from the absolute values of the blade angles, it is important that the latter return back into this enveloped range in a timely fashion. The mentioned intersection point is used as a start criterion in order for this to be monitored.

According to one aspect, an observation period for the rotor blade begins with the start criterion. The observation period ends when the rotor blade changes the actual angle thereof from an extreme angle to a non-extreme angle. The rotational progress is determined as an angle by which the rotor has rotated after the triggering of the start criterion within the observation period.

After the start criterion for a rotor blade, the actual angle of the rotor blade is an extreme angle. In the absence of a blade malposition it is to be anticipated that the profile of the blade angle after a determinable time will again intersect the profile of the blade angle of another rotor blade. The actual angle of the rotor blade in this instance changes from an extreme angle to a non-extreme angle. This temporal period is described by the observation period. The observation period thus corresponds to the temporal period in which the actual angle of the rotor blade is an extreme angle.

The observation period here is the temporal period in which the rotational progress of the rotor blade is determined. As soon as the observation period ends, the rotational progress of the rotor blade is reset to zero. In a fresh start criterion, the rotational progress is then freshly determined for the duration of the observation period.

The rotational progress is in particular determined in that an angular position of the rotor blade is determined in predefined discrete temporal steps, an angular variation is determined as the difference between the angular position of a current temporal step and an angular position of a temporal step preceding the current temporal step, and the angle variation is added until the observation period ends.

If the angular position of the rotor is determined in discrete temporal steps, an angular variation between two temporal steps can be determined therefrom in that the angular position of the preceding temporal step is subtracted from the angular position of the current temporal step. The rotational progress can be determined by successively adding these angular variations.

Alternatively, the rotational progress can be determined in that the angular position is determined at the point in time of the start criterion and at a current point in time at which the rotational progress is to be verified, and the rotational progress is determined as a difference between the angular position at the current point in time and at the point in time of the start criterion. In order to be able to detect rotational progresses of more than 360°, it may be necessary to identify full revolutions and add 360° to the difference after each full revolution.

As an alternative to determining extreme angles, the start criterion for a rotor blade can be formed or triggered when the actual angle of the rotor blade exceeds an angle mean value as the mean value of the actual angles of all rotor blades. In this case, the observation period ends when the actual angle of the rotor blade undershoots the mean value of all rotor blades. This is similar to taking into account only maximum angles when triggering the start criterion. It is disadvantageous here that the observation period becomes significantly larger such that errors are potentially identified only at a later stage.

According to one aspect, for an observed rotor blade, in particular a rotor blade of which the actual angle is an extreme angle, the blade angle deviation is determined as a difference between the actual angle and the reference angle.

The reference angle is in particular formed as the mean value of the actual angles of all rotor blades, and can be referred to as the angle mean value. The reference angle is thus a function of the actual values of the blade angles of all rotor blades and may vary over time.

Alternatively, the reference angle is formed by the actual angle of one of the other rotor blades, wherein the reference angle is in particular chosen such that the blade angle deviation is maximized.

To this end, differences between the actual angle of the observed rotor blade and the blade angles of all other rotor blades are determined in particular, and the highest value is selected therefrom, which may also be referred to as the difference maximum. That blade angle of the rotor blade that has led to the difference maximum in this instance corresponds to the reference angle.

It is preferable for the absolute values of the determined differences to be determined as absolute differences. In this case, the difference maximum corresponds to the maximum of the absolute differences.

Alternatively, the blade angle deviation is formed as the difference between two extreme angles. The reference angle here corresponds to the actual angle of that rotor blade that has an extreme angle but is not the observed rotor blade. As a result, this corresponds to the method in which the difference maximum is formed. The former differs however in terms of the specific implementation. The advantage lies in that the difference between the actual angle of the observed rotor blade and the blade angles of all other rotor blades does not have to be mandatorily determined. It suffices to determine which rotor blade likewise has an extreme angle and to choose the actual angle of the latter as the reference angle. Since it is continuously verified anyway which rotor blade has an extreme angle, the reference angle can thus be easily determined and the computing capacity can be minimized.

According to one aspect, for identifying a blade malposition a maximum blade angle deviation is predefined, the latter describing a blade angle deviation as from which a blade malposition is identified. The maximum blade angle deviation here is predefined as a function of the rotational progress. A blade malposition is identified when the blade angle deviation exceeds the maximum blade angle deviation.

The actual angle of a rotor blade that lies above the maximum blade angle deviation is thus an impermissible blade angle. At such impermissible blade angles, an unusual operating situation which potentially promotes extreme loads is prevalent, and an error message is emitted in order to initiate further safety-relevant measures for protecting the wind power installation.

The maximum blade angle deviation is in particular predefined as a function of the rotational progress, in particular in portions as a function of the rotational progress. The maximum blade angle deviation thus varies as the rotational progress increases, said maximum blade angle deviation in particular decreasing as the rotational progress increases. By virtue of the in-portions function, it is also possible that the blade angle deviation jumps to higher or lower values.

In this way, ever smaller blade angle deviations are accepted as the rotational progress increases, or a blade malposition is identified at ever smaller blade angle deviations, respectively.

However, the maximum blade angle deviation has in particular a value of 10° or less. In this way, there is also a maximum limit which must not be exceeded. This relates to the case in which the reference angle is chosen such that the blade angle deviation is maximized. If the reference angle corresponds to the angle mean value, the maximum limit of the maximum blade angle deviation is approximately 5°.

According to one aspect it is proposed that the maximum blade angle deviation as a function of the rotational progress is established by evaluating a behavior of the wind power installation, in particular by simulation. To this end, in the evaluation an operation of the wind power installation at variable environmental parameters, in particular variable wind situations, is simulated or observed in the running operation, and pairs of values of the blade angle deviation and the associated rotational progress are recorded in the process. The maximum blade angle deviation is then determined as a function of the detected pairs of values, wherein the maximum blade angle deviation is determined such that the latter has higher values than the blade angle deviation of the pairs of values of the same rotational progress. This may also be described such that in an illustration of the maximum blade angle deviation and of the pairs of values in a diagram, the pairs of values are below the maximum blade angle deviation.

A model of the wind power installation is thus established. The maximum blade angle deviation is determined as a function of the model, specifically by the simulation, wherein various operating situations are simulated. However, different gustiness intensities are also considered. The blade angle deviation and the rotational progress of the rotor blades is determined for each operating situation. The maximum blade angle deviation is determined as a function of the determined pairs of values, thus of the blade angle deviation/rotational progress pairs.

The dependency of the blade angle deviation on the rotational progress is thus derived from the application of the model, thus from the simulation. The various operating situations comprise various weather conditions or wind conditions, wherein different wind directions, wind velocities and/or wind gradients are taken into account in particular. However, different gustiness intensities are also considered. The behavior of the installation is simulated for each of these situations. In the process, the rotational progress as well as the blade angle deviation is determined from the simulation. All operating situations which have led to an error-free result, thus in particular the operating situations in which the arising loads are permissible, are classified as usual. The associated blade angle deviation/rotational progress pairs are thus defined as permissible. Since no malposition, such as blade jamming, arises in the simulation, all results of the simulation, thus all recorded pairs of values, are permissible and can be classified as usual.

Blade angle deviation/rotational progress pairs that correspondingly do not arise, thus ranges in which such pairs of values have not occurred, are classified as unusual and thus impermissible. Alternatively however, it is possible for seldom occurring blade angle deviation/rotational progress pairs to be excluded. To this end, a histogram of the arising blade angle deviation/rotational progress pairs can be established, and a threshold as from which a blade angle deviation/rotational progress pair is to be classified as sufficiently frequent and thus permissible, and vice versa, can be established.

The maximum blade angle deviation is determined as a function of the blade angle deviation/rotational progress pairs classified as permissible. To this end, the delimitation of the area of known permissible blade angle deviation/rotational progress pairs is determined at various supporting points, and a table is established from the supporting points. The maximum blade angle deviation is derived from the supporting points of the table, or by interpolation between the supporting points.

However, instead of a simulation, the running operation can also be evaluated. It is assumed here that errors do not initially arise. A jammed rotor blade in particular tends to arise during a comparatively long operation, the determination of the maximum blade angle deviation here having been completed beforehand.

In any case, it has been recognized that an error-free-range has been recorded by recording the usual pairs of values. The remaining range in which no operating states, thus pairs of values, usually arise therefore does not have to be considered an error-free range. The maximum blade angle deviation thus forms a limiting curve between these ranges.

According to one aspect it is proposed that the maximum blade angle deviation is stored in a table and/or is stored as a partial limiting curve. This can be the result in particular when the maximum blade angle deviation is established by simulation. As a result, arbitrary curves which are adapted to a specifically examined behavior of a wind power installation can be stored.

According to one aspect, for at least one portion the maximum blade angle deviation decreases as the rotational progress increases.

The larger the rotational progress angle, the greater the probability that a blade malposition arises. In the ideal case, the actual angles of the rotor blades would follow the target angle. In a predefined sinusoidal profile it follows that a change from an extreme to a non-extreme angle takes place every 120°. In this case, a rotational progress angle of 120° is thus anticipated. However, by virtue of turbulences and resulting potential conjointly rotating, wind-induced loads it is possible that rotational progresses of more than 120° arise and are also permissible. Rotational progresses of more than 360° can also arise by virtue of conjointly rotating, wind-induced loads. Depending on the situation, it is thus possible that a change from an extreme to a non-extreme angle takes place only after a rotational progress of approximately 360° even in the error-free operation, thus that a permissible rotational progress can be up to approximately 360°. To this end, permissible rotational progresses that increase to substantially more than 360° before a change from an extreme to a non-extreme angle takes place are rare. Permissible rotational progresses are typically below or only a few degrees above 360°. However, the probability of a blade malposition increases as the rotational progress continues. Therefore, a blade malposition is identified already at minor blade angle deviations if the rotational progress is large.

In particular, the maximum blade angle deviation for at least one portion decreases in a hyperbolic or linear manner. It has been recognized that high blade angle deviations are still permissible at a minor rotational progress, but rapidly decrease as the rotational progress increases. On the other hand, only minor blade angle deviations are still permissible at a high rotational progress. However, the permissible blade angle deviations only drop to a minor extent as the rotational progress continues to increase.

It is usually to be anticipated that the maximum blade deviation as a function of an increasing rotation angle decreases in a hyperbolic manner. According to one aspect it is proposed that a linear portion is chosen. The linear portion can be described or predefined by at least two points. A decrease which is linear in portions can lead to excessive blade angle deviations pertaining to some rotational progresses not being identified as excessive. As the rotational progress further increases, said excessive blade angle deviations are then however, thus somewhat later, identified as being excessive and thus impermissible. Predefining a linear decrease however has the advantage that the method is easier to implement and can also be more rapidly adapted when new permissible pairs of values for the blade angle and the rotational progress are found.

According to one aspect the blade angle deviation and the rotational progress define an area, specifically in a diagram, in which the blade angle deviation is plotted over the rotational progress, said area being delimited by the maximum blade angle deviation. A blade malposition is identified as a function of the defined area, wherein a blade malposition is identified when the pair composed of the blade angle deviation and the rotational progress departs from the defined area.

It is advantageous here that the area that is delimited by the maximum blade angle difference is easier to determine than the maximum blade angle difference per se, because the maximum blade angle difference, which forms a limiting curve for the area, would have to be additionally determined once the area has been determined. Simulations can also be used to this end in order for the area to be determined, for example.

According to one aspect the maximum blade angle deviation is predefined as a function of an operating state of the wind power installation. The operating state comprises a partial-load operation, a full-load operation or a storm operation. Additionally or alternatively, the operating state comprises a start-up procedure, a normal operation, a stopping procedure or an emergency stopping procedure of the wind power installation. In particular, the maximum blade angle deviation as a functional profile is predefined as a function of the rotational progress, wherein different functional profiles are predefined for different operating states. In particular, the maximum blade angle deviation as a functional profile is predefined as a function of the rotational progress. Additionally, different functional profiles are predefined for different operating states.

It is thus likewise possible that different maximum blade angle deviations as from which a blade malposition is identified are predefined for different operating states. These maximum blade angle deviations here may be different functions of rotational progress. This has the advantage that a more exact differentiation can take place in terms of situations in which a blade malposition is to be identified.

Difference is made here between the operating states of partial-load operation, full-load operation or storm operation. In the full-load operation there is sufficient wind available such that the wind power installation can operate at the nominal output. In the partial-load operation, there is not sufficient available wind in order for the nominal output to be achieved. In the storm operation, the prevalent wind forces are so high that the output has to be reduced in order to avoid damage to the installation. It has been recognized that each one of these operating states permits different dependencies of the blade angle deviation on the rotational progress.

All these maximum blade angle deviations which, like all maximum blade angle deviations described, which are variable, can be referred to as a limiting curve, can be established by evaluating a behavior of the wind power installation, in particular by simulation as has been described in the context of preceding aspects.

Alternatively or additionally, a differentiation is made between the operating states start-up procedure, normal operation, stopping procedure or emergency stopping procedure. It has likewise been recognized that it may be advantageous to differentiate between start-up phase, normal operation and switching-off.

According to one aspect, a profile of an anticipated blade angle deviation as a function of the rotational progress is predefined as the anticipated profile. A tolerance range in which a profile of a detected blade angle deviation may deviate from the anticipated profile is predefined for the anticipated profile. The blade angle malposition is identified as a function of whether the profile of the detected blade angle deviation departs from the tolerance range.

The anticipated profile thus describes the profile of the deviation of the blade angle from the reference angle in the case that no blade malpositions are anticipated. The blade angle deviation here can vary with the rotor position, because the blade angle deviation is the result of an individual blade adjustment which adapts each rotor blade in terms of the blade angle thereof individually and dynamically to the rotation of the rotor. Accordingly, the anticipated profile is predefined as a function of the rotational progress.

By virtue of arising wind conditions, in particular of the arising wind direction and/or wind velocity, the detected, thus actual, blade angle deviation which describes the deviation of an actual angle from the reference angle deviates from the anticipated profile. However not every deviation is impermissible here. The tolerance range which is permissible by virtue of the arising wind conditions is thus defined and predefined. Only those detected blade angle deviations that depart from the tolerance range are identified as impermissible, as a result of which a blade malposition is identified.

The anticipated profile is preferably provided as cyclical profile, in particular sinusoidal profile, and is characterized by a period length and/or amplitude.

Based on an individual blade adjustment, each rotor blade in terms of the blade angle thereof is individually and dynamically adapted to the rotation of the rotor. It is anticipated here that this is repeated in a cyclical manner with the rotation of the rotor, and this is therefore also assumed for the resultant blade deviation. Therefore, after a rotation of the rotor a blade angle should again have the same blade angle deviation. It is therefore proposed that the anticipated blade angle deviation is also accordingly predefined and as a cyclical profile is therefore predefined as a function of the rotational progress, thus as a function of the rotation of the rotor. A particularly advantageous profile here is a sinusoidal profile. A cyclical profile which can be described by the period length and/or amplitude thereof is at least chosen.

It is in particular also possible to determine the period length and/or amplitude of the identified blade angle deviation. The temporal profile of the actual angles, and thus the identified blade angle deviation, can deviate from the values and profiles anticipated, or predefined as anticipated, respectively. Depending on the weather conditions, a temporal cyclical profile and/or a cyclical profile as a function of the rotational progress can in this instance be elongated or compressed to a dissimilar degree. The elongation and compression here is a function of the arising wind conditions, in particular wind force and wind direction. The tolerance range in this instance defines the range in which the determined period length and/or amplitude are/is permissible. A deviation from the anticipated profile can thus also be evaluated by way of an elongation or compression that arises.

Alternatively or additionally, the tolerance range as a function of the rotational progress predefines in each case a positive critical deviation and a negative critical deviation by which the detected blade angle deviation may exceed or undershoot the anticipated profile.

For each rotational progress the blade angle deviation is thus predefined a specific upper and lower critical deviation. If the detected blade angle deviation further deviates during a corresponding rotational progress, a blade malposition is identified. The positive critical deviation and the negative critical deviation can be chosen to be dissimilar.

The period length and/or the amplitude can be predefined a tolerance range so as to evaluate a deviation by way of the latter. The mentioned elongations and/or compressions can be evaluated by way of said tolerance range. The anticipated profile can also be predefined an upper and lower critical deviation so as to evaluate the deviation by way of the latter. If both variants are implemented as criteria, a blade malposition is identified when at least one criterion indicates a blade malposition.

Provided is a wind power installation having one rotor and at least three rotor blades which in terms of the blade angles thereof are individually adjustable is likewise proposed, wherein the wind power installation is prepared to carry out a method for identifying a blade malposition according to one of the preceding aspects/embodiments, and the wind power installation has in particular a measurement (e.g., one or more sensors, gauges or laser devices) and control installation (e.g, controller) on which the method for identifying a blade malposition is implemented.

The wind power installation is thus specified to identify a blade malposition and when identifying a blade malposition to initiate necessary control measures. The wind power installation is in particular switched off when a blade malposition is identified.

BRIEF DESCRIPTION OF THE SEVERAL VIEWS OF THE DRAWINGS

The present invention will be explained in more detail by way of example hereunder with reference to the appended figures, wherein the same reference signs may be used for identical or similar modules of elements. In the figures.

DETAILED DESCRIPTION

Figure 1:
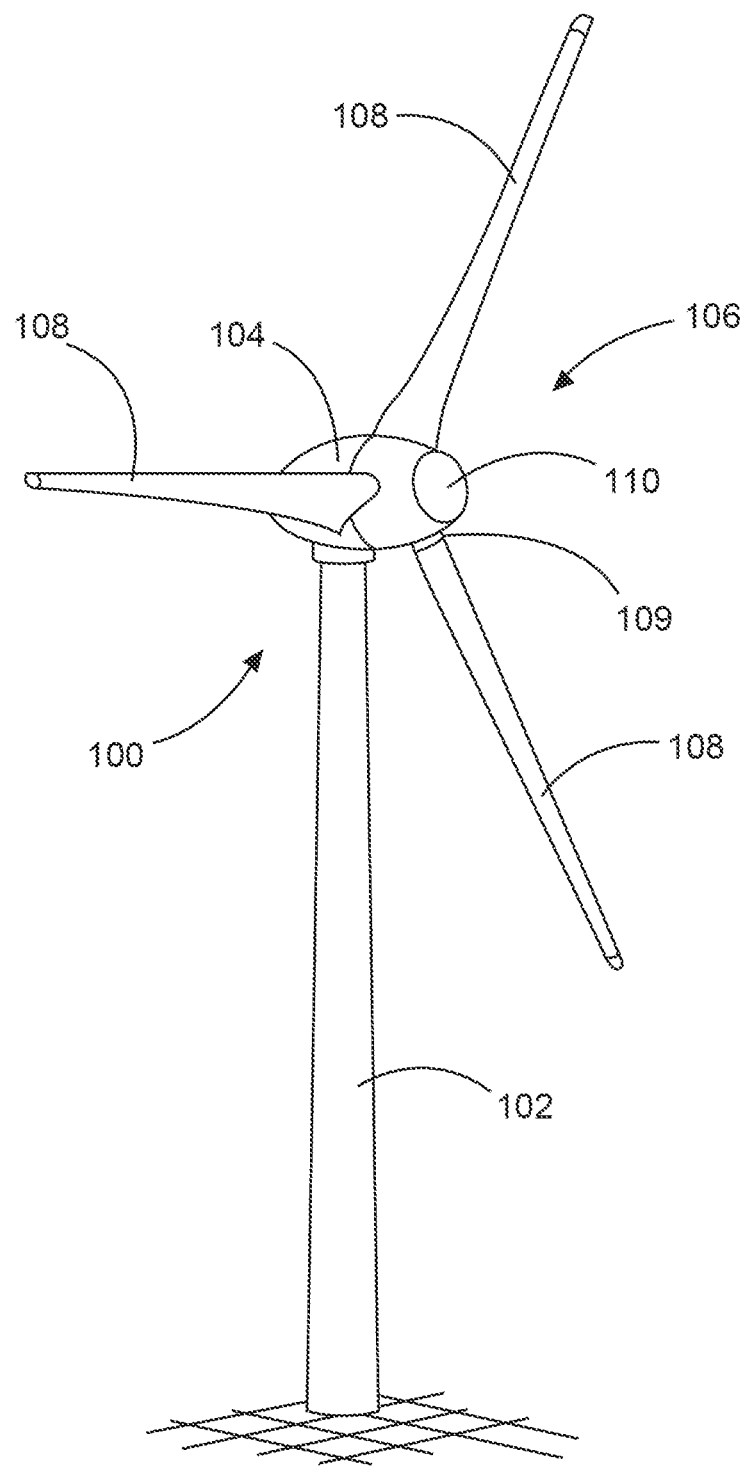
FIG. 1 shows a wind power installation in a perspective view.

FIG. 1 shows a wind power installation. The wind power installation 100 has a tower 102 and a nacelle 104. A rotor 106, which has three individually adjustable rotor blades 108 and a spinner 110 is disposed on the nacelle 104. During operation, the rotor 106 is set in rotation by the wind and as a result drives an electric generator in the nacelle 104.

Figure 2:
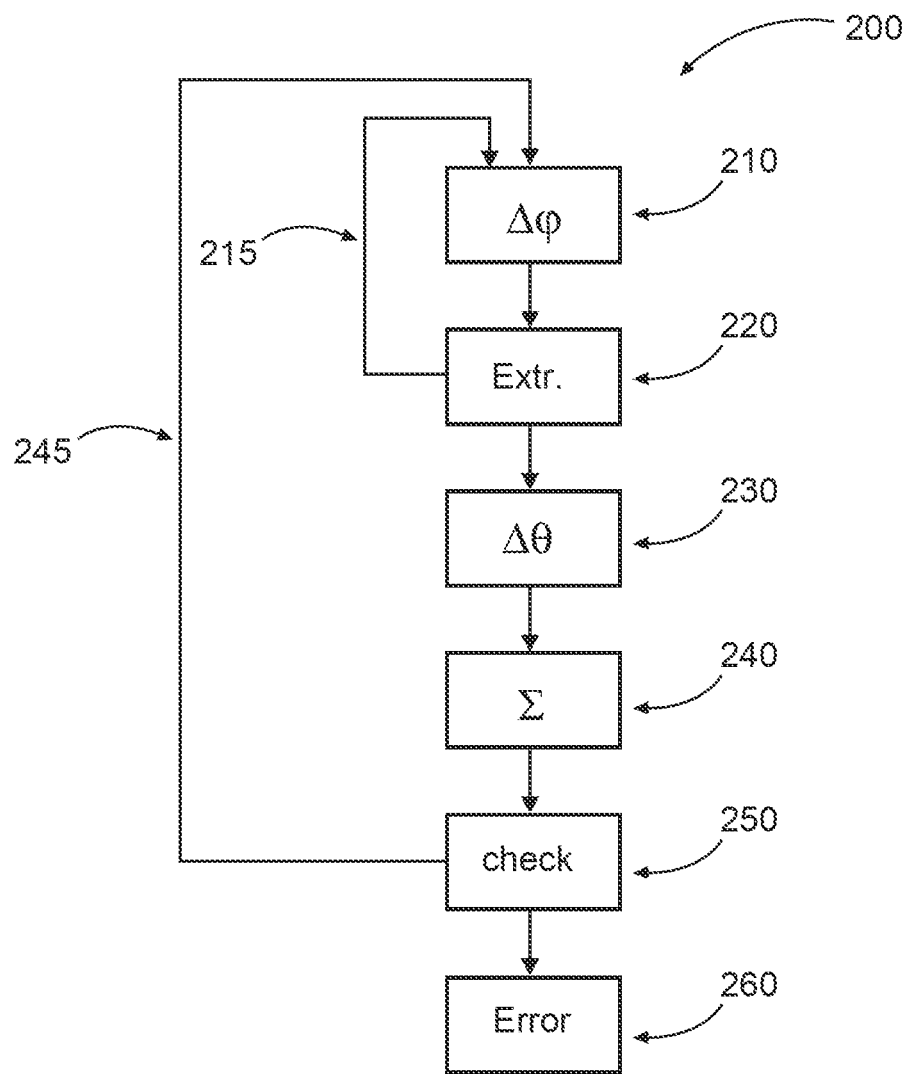
FIG. 2 shows a method for identifying a blade malposition.

FIG. 2 shows a method 200 for identifying blade malpositions. In an angle determination step 210, the angle by which the rotor has rotated onward in comparison to a preceding discrete temporal step is initially determined. To this end, the rotor position is determined and the rotor position at the preceding temporal step is subtracted therefrom.

In an extreme test step 220 it is determined for each blade whether the actual angle thereof is an extreme angle. If it is established for a rotor blade that the latter has an extreme angle, the next step is used to continue. Otherwise, the rotational progress of the rotor blade is reset to zero, and the next temporal step again begins with the angle determination step 210, this being highlighted by the inner loop 215.

In contrast, if a rotor blade has an extreme angle, a deviation determination step 230 is used to continue. Here, the blade angle deviation from the reference angle is to be determined in that the current maximum blade angle deviation of this rotor blade from the other rotor blades is determined. To this end, the difference between the actual angle of the rotor blade and the actual angles of the other rotor blades is formed. The greater difference in terms of value then corresponds to the current maximum blade angle deviation.

The angle that has been determined in the angle determination step 210 is furthermore added to the rotational progress of the rotor blade in the adding step 240. In this way, the rotational progress is successively added until it is established for the rotor blade in the extreme test step 220 that said rotor blade does not have any extreme angle and the rotational progress is reset to zero again.

In the comparison step 250 the current values of the actual angle and of the rotational progress of the rotor blade are compared with the maximum blade angle deviations. To this end, it can be verified in a table whether the actual angle pertaining to the rotational progress has a permissible value or can be, or must be, assigned to a blade malposition.

If the pair composed of the actual angle and the rotational progress is assigned to a blade malposition, an error is emitted in the error emission step 260, and the wind power installation is switched off.

As long as no blade malposition is identified, the method at the next temporal step begins again with the angle determination step 210, this being highlighted by the outer loop 245.

Figure 3:
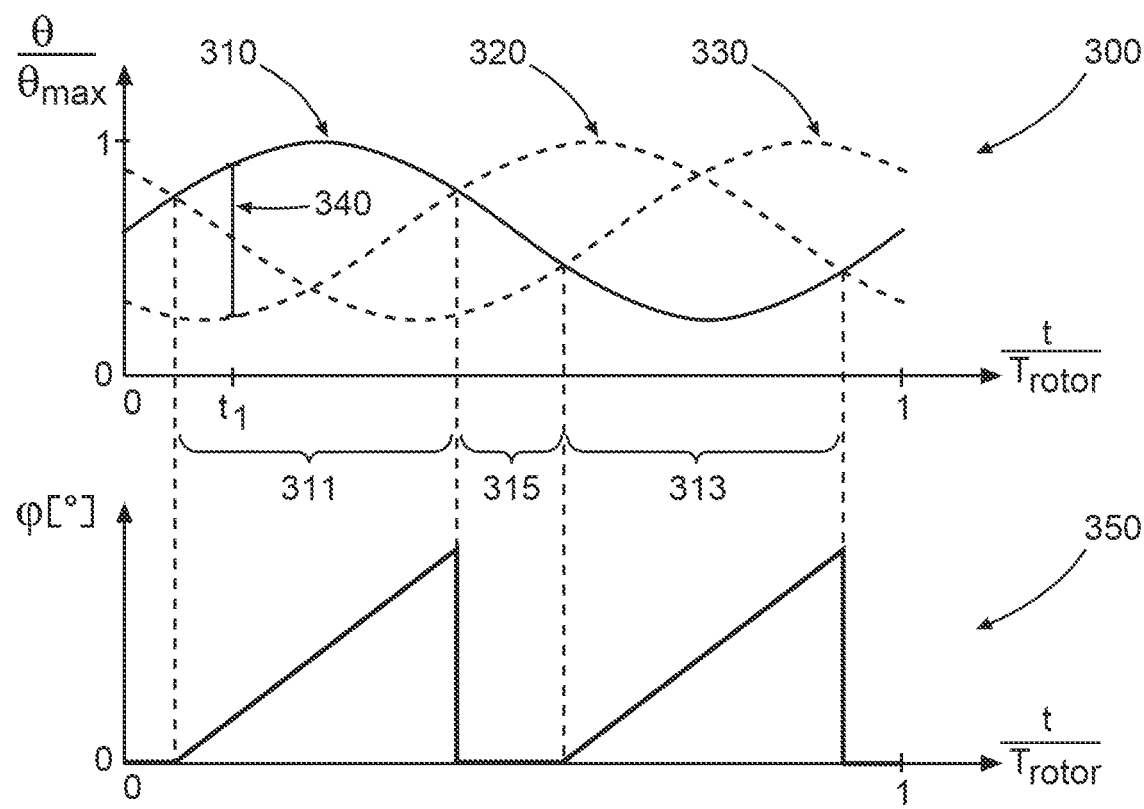
FIG. 3 shows a theoretical profile of actual angles and the rotational progress.

FIG. 3 shows the behavior of a rotor blade under optimal conditions, thus in the absence of a blade malposition. Two coordinate systems are shown to this end.

In the first coordinate system 300, the time t is illustrated on the abscissa, standardized to the duration of one rotor revolution $T_{rotor}$. Illustrated on the ordinate is the blade angle of the rotor blade θ in degrees, standardized to the maximum adjusted target blade angle $θ_{max}$.

The profile of the actual angles 310 is illustrated, thus the profile of the blade angle of an observed exemplary first rotor blade. The predefined target angle is sinusoidal. Under optimal conditions the profile of the actual angles 310 of the first rotor blade is thus also sinusoidal. The profiles 320, 330 of the actual angles of the other two rotor blades, which may be referred to as the second and the third rotor blade, are likewise illustrated in dashed lines.

The ranges 311, 313 correspond to the ranges in which the first rotor blade has an extreme angle. The actual angle 310 of the first rotor blade here either is larger than the actual angle 320, 330 of the other rotor blades (range 311), or the actual angle 310 of the first rotor blade is smaller than the actual angle 320, 330 of the other rotor blades (range 313). The first rotor blade in the range 315 has a non-extreme angle. Accordingly, one observation period for the first rotor blade is in each case illustrated by the ranges 311, 313.

The blade angle deviation 340 is illustrated at an exemplary point in time ti. Said blade angle deviation 340 indicates the maximum blade angle deviation from the two other rotor blades. The blade angle deviation 340 thus corresponds to the difference between two extreme actual angles. In this example thus between the actual angles of the first and the second rotor blade.

The second coordinate system 350 shows the rotational progress φ on the ordinate from 0° to 120°, thus how far the rotor has rotated. The standardized time for the same temporal range as for the first coordinate system 300 is shown on the abscissa. The profile of the rotational progress 360 under optimal conditions is illustrated for the first rotor blade. The rotational progress is thus successively determined within the observation periods 311, 313. The observation period ends as soon as the actual angle 310 transitions to a non-extreme angle, and the rotational progress 360 is reset to zero.

It is to be anticipated by virtue of the theoretical sinusoidal profile of the blade angles that a rotor blade maintains an extreme angle for one rotation of the rotor by 120°. It has to be taken into account, however, that this is to be anticipated only in theory. Rather, rotational progresses of more than 120° may also permissibly arise. For example, it may occur by virtue of turbulences that the rotor rotates further than the theoretical 120° before a rotor blade with an extreme angle transitions to a non-extreme angle.

A blade malposition is now to be identified by means of the actual angle and the rotational progress. Both variables must thus always be taken into account for the identification.

Figure 4:
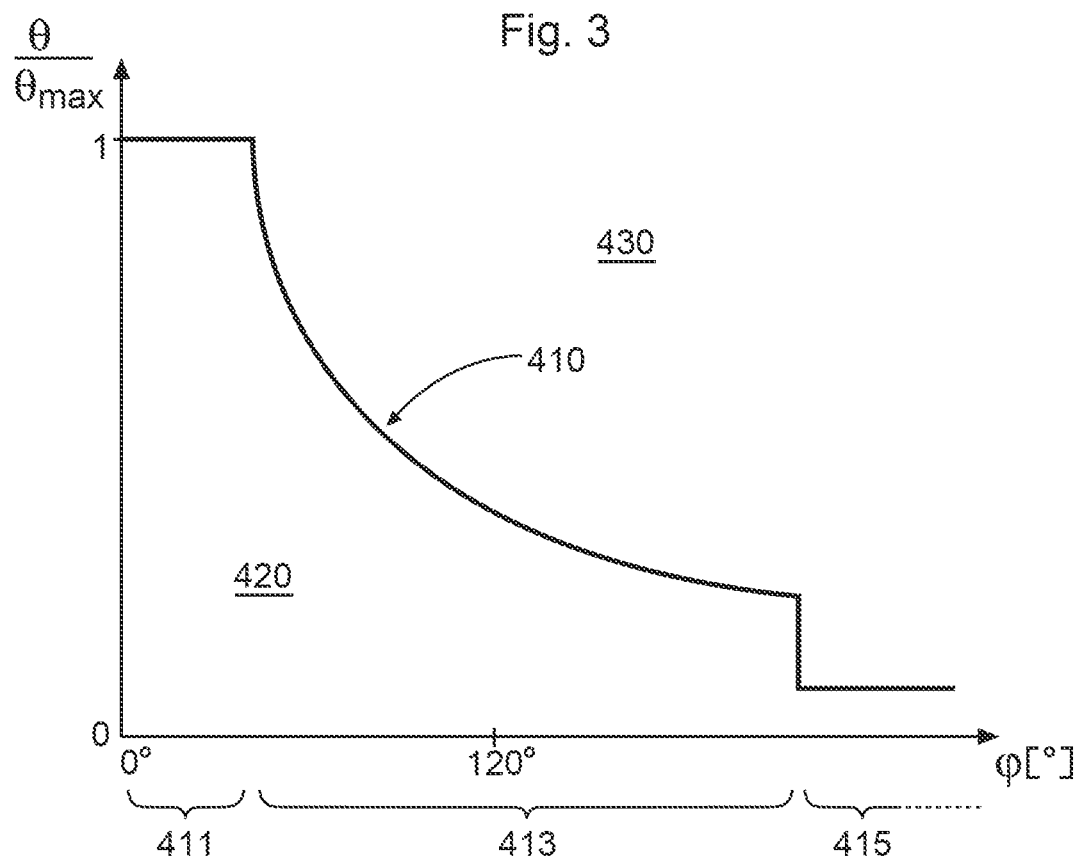
FIG. 4 shows an exemplary profile of a maximum blade angle deviation.

FIG. 4 shows an exemplary profile of a maximum blade angle deviation 410. Illustrated is a coordinate system in which the blade angle deviation θ on the ordinate is plotted in relation to the rotational progress φ on the abscissa. The blade angle deviation θ is standardized to an upper blade angle deviation $θ_{max}$ which, independently of the rotational progress, must not be exceeded and is usually 10°.

The maximum blade angle deviation 410 is a function of the rotational progress φ. The profile of the maximum blade angle deviation 410 results from simulations using a model of the wind power installation.

The coordinate system is divided into two ranges by the maximum blade angle deviation 410. Specifically a permissible range 420 and an impermissible range 430. An area 420 of permissible blade angle deviation/rotational progress pairs is thus defined, said area 420 being delimited by the maximum blade angle deviation 410. The maximum blade angle deviation 410 thus forms a limiting curve.

The exemplary profile of the maximum blade angle deviation 410 has a plurality of portions 411, 413, 415. The portion 411 at small rotational progress angles is constant. The identification of a blade malposition here thus takes place independently of the rotational progress. The adjoining range 413 at further increasing rotational progresses decreases in a hyperbolic manner. However, other profiles, such as a linear decrease, for example, would also be possible. An offset may optionally also be taken into account, as is shown in portion 415. In this case, it is permissible for the rotational progress to continuously increase as long as the blade angle deviation remains below the predefined offset.

As long as a pair composed of the actual angle and the rotational progress of a rotor blade is within the area 420 thus defined, an identification of a blade malposition does not take place. However, if a blade angle deviation/rotational progress pair does depart from the permissible range and exceeds the maximum blade angle deviation 410, a blade malposition is identified.

Other profiles of the maximum blade angle deviation than the profile illustrated in FIG. 4 are possible.

Figure 5:
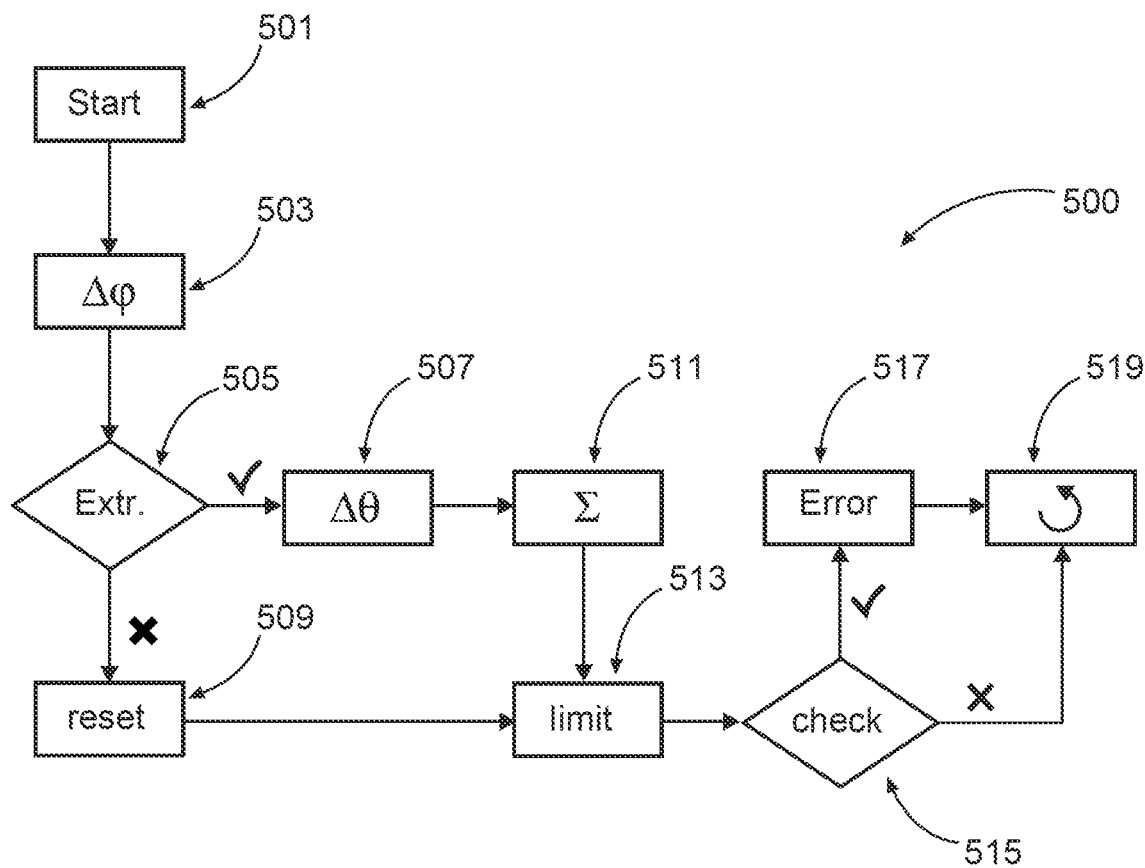
FIG. 5 shows a further method for identifying a blade malposition.

FIG. 5 likewise visualizes a method 500 for identifying blade malpositions. A rotor blade to be observed is initially selected in a rotor blade selection step 501. The angle by which the rotor has rotated in comparison to the preceding temporal step is determined in an angle determination step 503.

In an extreme test step 505 it is determined whether the rotor blade has an extreme angle. If the rotor blade has an extreme angle, the method continues with the deviation step 507. Should the rotor blade have a non-extreme angle, the rotational progress of the rotor blade and the blade angle deviation of the rotor blade is reset to zero in a reset step 509.

The current blade angle deviation of the rotor blade is determined in the deviation step 507. The blade angle deviation relative to the reference angle is to be determined in that the current maximum blade angle deviation of this rotor blade in comparison to the other rotor blades is determined. To this end, the difference between the actual angle of the rotor blade and the actual angles of the other rotor blades is formed. The difference with a higher value then corresponds to the current maximum blade angle deviation.

Adjoining the deviation step 507, the angle determined in the angle determination step 503, by which the rotor has rotated in comparison to the preceding temporal step, is added to the rotational progress of the rotor blade in an adding step 511. The rotational progress is successively increased in this way. The rotational progress of the rotor blade is reset in the reset step 509 only once the same rotor blade has been reselected at a later temporal step in the rotor blade selection step 501, and a non-extreme angle has been established in the extreme test step 505.

Adjoining the adding step 511 and adjoining the reset step 509, it is determined in a critical value determination step 513 which momentary critical value applies to the current blade angle deviation. To this end, the current values for the rotational progress and the blade angle deviation are interpolated and the current critical value is uploaded from the critical value table determined.

In an adjoining comparison step 515 it is verified whether the current blade angle deviation is above the applicable critical value. If it is above the applicable critical value determined in the critical value determination step 513, an error message is emitted in an error emission step 517, and an emergency shutdown procedure is initiated in order to switch off the wind power installation.

Additionally, a critical value for the rotational progress can also be determined in the critical value determination step 513, the adherence to the former being able to be verified in the comparison step 515.

The procedure is terminated in a final step 519 following the emergency shutdown.

In contrast, if it is determined in the comparison step 515 that a permissible behavior is present, i.e., that the blade angle deviation is not above the applicable critical value, a next rotor blade is selected in the completion step 519, and the method is restarted for this rotor blade with the rotor blade selection step 501.

The following has also been recognized in particular, and the following is proposed.

Proposed is an algorithm for identifying unusual blade angle differences and determining associated critical values based on anticipated values which have been determined by means of many-body simulations. Two aspects or two parts described herein can be differentiated at least for the purpose of explanation. A first part or aspect relates to the determination of suitable anticipated values and the identification of a suitable correlation. The first aspect can be performed offline. The second part or aspect relates to the determination of momentary values and the reconciliation with critical values. The second part can be performed online and in real time.

The first part or aspect can be summarized by the following substantial points. By virtue of a dominant shearing effect it is initially assumed that in the case of three rotor blades with individual blade adjustment the actual angles of the rotor blades thus lead to a sinusoidal profile of the blade angles, having a corresponding 120° phase shift. A number of rotor blades other than three would correspondingly lead to a different phase shift.

It is assumed that load-critical situations are created as soon as a blade angle deviation exists and results from the rotor blade that is pitched either outward or inward to the greatest degree. These rotor blades are also referred to as "enveloping blade" or blade with an extreme angle.

Based on the assumption of the 120° phase shift, a rotor blade over a rotor revolution of 120° is "enveloping." This property of the individual blade adjustment is utilized to determine an anticipation, specifically pertaining to over how many rotor revolutions a rotor blade is enveloping, thus has an extreme angle.

By virtue of turbulence and resulting potential "co-rotating loads," enveloping blades, thus rotor blades with extreme angles, can be anticipated over rotor revolutions of more than 120°.

Overall, there thus is a correlation between anticipated and non-anticipated ("forbidden") current blade angle deviations and accumulated rotor revolutions which are used as critical values.

The anticipations, thus blade angle deviations to be anticipated, are determined by means of simulations in required operating situations so that the safety function does not lead to a shutdown of the installation in these situations.

The second part or aspect can be summarized by the following substantial points.

Initially, the rotor revolution since the last function command, or the last temporal step, is determined. This is thus the angle by which the rotor has rotated in comparison to the last temporal step; this may also be referred to as a rotor increment.

For each rotor blade it is verified whether the latter is "enveloping," thus has an extreme angle. Should this not be the case, the following steps can be ignored.

Subsequently, the current maximum blade angle deviation of this rotor blade in comparison to other rotor blades is determined, and the rotor increment is added to the current, already accumulated rotational progress.

By means of these momentary values, the momentary critical values can be determined and reconciled by means of the table determined in the first part.

If the critical value is exceeded, there is an unusual operating situation that potentially promotes extreme loads, which is why a safe emergency operating mode is carried out.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method for identifying a blade malposition of a rotor blade of a wind power installation,
wherein the wind power installation has one rotor and at least three rotor blades having respective blade angles that are individually adjustable, and
wherein the method comprises:
detecting, for each rotor blade of the at least three rotor blades, an actual blade angle; and
determining the blade malposition based on:
a blade angle deviation of the rotor blade, and
a rotational progress of the rotor, wherein:
the blade angle deviation represents a deviation of the actual blade angle from a reference angle, and
the rotational progress represents an angle about which the rotor has rotated onward after a start criterion.

2. The method according to claim 1, wherein:
for each rotor blade of the at least three rotor blades, a target angle of the blade angle is predefined having a temporally cyclical profile, and
profiles of target angles of the at least three rotor blades, respectively, are phase-shifted in relation to each other.

3. The method according to claim 2, wherein the profiles are sinusoidal.

4. The method according to claim 1, comprising:
determining in successive discrete temporal steps, for each rotor blade of the at least three rotor blades, whether the actual blade angle of the rotor blade is an extreme angle, wherein the rotor blade angle is an extreme angle when:
the actual blade angle is larger than the actual blade angles of all other rotor blades of the at least three rotor blades, or
the actual blade angle is smaller than the actual blade angles of all other rotor blades of the at least three rotor blades; or
determining in successive discrete temporal steps, for each rotor blade of the at least three rotor blades whether the actual blade angle is a non-extreme angle, wherein the rotor blade angle is a non-extreme angle when:
the actual blade angle is smaller than an actual blade angle of at least one of the other rotor blades of the at least three rotor blades, and
the actual blade angle is larger than an actual blade angle of at least another one of the other rotor blades of the at least three rotor blades.

5. The method according to claim 4, comprising:
determining the blade malposition based on whether the actual blade angle is an extreme angle or a non-extreme angle.

6. The method according to claim 1, comprising:
triggering the start criterion for a rotor blade by a transition of the actual blade angle of the rotor blade from a non-extreme angle to an extreme angle.

7. The method according to claim 1, wherein:
an observation period for the rotor blade begins at a beginning of the start criterion, and the observation period ends when the actual blade angle of the rotor blade changes from an extreme angle to a non-extreme angle, and
the rotational progress is determined based on an angle by which the rotor has rotated after triggering the start criterion within the observation period.

8. The method according to claim 7, wherein an angular position of the rotor is determined in predefined discrete temporal steps, an angular variation is determined as a difference between the angular position of a current temporal step and an angular position of a temporal step preceding the current temporal step, and the angular variation is added until the observation period ends.

9. The method according to claim 1, comprising:
for an observed rotor blade having an actual blade angle that is an extreme angle, determining the blade angle deviation as a difference between the actual blade angle and the reference angle, and
determining the reference angle as a mean of the actual blade angles of all rotor blades of the at least three rotor blades; or
determining the reference angle as the actual blade angle of rotor blades other than the observed rotor blade.

10. The method according to claim 9, comprising:
selecting the reference angle to maximize the blade angle deviation;
determining differences between the actual blade angle of the observed rotor blade and the blade angles of all other rotor blades of the at least three rotor blades;
determining a difference maximum of the determined differences; and setting the blade angle deviation for the observed rotor blade to the difference maximum.

11. The method according to claim 9, comprising:
determining the blade angle deviation as a difference between two extreme angles.

12. The method according to claim 1, comprising:
predefining a maximum blade angle deviation representing a blade angle deviation from which the blade malposition is identified; and
predefining the maximum blade angle deviation as a function of the rotational progress.

13. The method according to claim 12, wherein the maximum blade angle deviation is 10° or less, and the blade malfunction is identified when the blade angle deviation exceeds the maximum blade angle deviation.

14. The method according to claim 1, wherein:
a maximum blade angle deviation as a function of the rotational progress is established by evaluating a behavior of the wind power installation, wherein:
in the evaluation an operation of the wind power installation with variable environmental parameters is simulated or observed in a running operation; and
pairs of values of the blade angle deviation and associated rotational progress are recorded; and
the maximum blade angle deviation is determined as a function of the detected pairs of values, wherein
the maximum blade angle deviation is determined such that:
the maximum blade angle deviation has higher values than the blade angle deviation of the pairs of values of the same rotational progress; or
in an illustration of the maximum blade angle deviation and of the pairs of values in a diagram, the pairs of values are below the maximum blade angle deviation.

15. The method according to claim 12, wherein the maximum blade angle deviation is stored:
in a table; or
as a partial limiting curve.

16. The method according to claim 12, wherein for at least one portion the maximum blade angle deviation decreases as the rotational progress increases.

17. The method according to claim 12, wherein:
the blade angle deviation and the rotational progress define an area which is delimited by the maximum blade angle deviation,
the blade malposition is identified as a function of the defined area, and
the blade malposition is identified when a pair composed of the blade angle deviation and the rotational progress departs from the defined area.

18. The method according to claim 12, wherein:
the maximum blade angle deviation is predefined as a function of an operating state of the wind power installation, wherein
the operating state includes:
a partial-load operation, a full-load operation or a storm operation; or
a start-up procedure, a normal operation, a stopping procedure, or an emergency stopping procedure of the wind power installation.

19. The method according to claim 18, wherein the maximum blade angle deviation as a functional profile is predefined as a function of the rotational progress and different functional profiles are predefined for different operating states.

20. The method according to claim 1, wherein:
a profile of an anticipated blade angle deviation as a function of the rotational progress is predefined as an anticipated profile;
a tolerance range in which a profile of a detected blade angle deviation is allowed to deviate from the anticipated profile is predefined for the anticipated profile; and
the blade angle malposition is identified as a function of whether the profile of the detected blade angle deviation departs from the tolerance range.

21. The method according to claim 20, wherein:
the anticipated profile is provided as a cyclical profile or a sinusoidal profile and is characterized by a period length or amplitude; or
the tolerance range as a function of the rotational progress predefines in each case a positive critical deviation and a negative critical deviation by which the detected blade angle deviation is permitted to exceed or undershoot the anticipated profile.

22. A wind power installation, comprising:
a rotor;
at least three rotor blades having respective blade angles that are individually adjustable;
a sensor configured to detect, for each rotor blade of the at least three rotor blades, an actual blade angle; and
a controller configured to:
determine a blade malposition of a rotor blade of the at least three rotor blades based on:
a blade angle deviation of the rotor blade, and
a rotational progress of the rotor, wherein:
the blade angle deviation represents a deviation of the actual blade angle from a reference angle, and
the rotational progress represents an angle about which the rotor has rotated onward after a start criterion.

* * * * *